(12) United States Patent
Sugimura

(10) Patent No.: US 9,160,177 B2
(45) Date of Patent: Oct. 13, 2015

(54) SEMICONDUCTOR CIRCUIT, BATTERY MONITORING SYSTEM, AND CONTROL METHOD

(75) Inventor: Naoaki Sugimura, Tokyo (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 536 days.

(21) Appl. No.: 13/611,638

(22) Filed: Sep. 12, 2012

(65) Prior Publication Data

US 2013/0069597 A1    Mar. 21, 2013

(30) Foreign Application Priority Data

Sep. 21, 2011 (JP) ................................ 2011-206124

(51) Int. Cl.
*H02J 7/00* (2006.01)
(52) U.S. Cl.
CPC ................. *H02J 7/00* (2013.01); *H02J 7/0016* (2013.01); *H02J 7/0021* (2013.01)
(58) Field of Classification Search
CPC .......... H02J 7/00; H02J 7/0016; H02J 7/0021
See application file for complete search history.

(56) References Cited

U.S. PATENT DOCUMENTS

| | | | | |
|---|---|---|---|---|
| 5,530,336 A * | 6/1996 | Eguchi et al. | ................. | 320/118 |
| 5,825,155 A * | 10/1998 | Ito et al. | ................. | 320/118 |
| 7,508,171 B2 * | 3/2009 | Carrier et al. | ................. | 320/138 |
| 7,609,030 B2 * | 10/2009 | Uesugi et al. | ................. | 320/118 |
| 7,733,059 B2 * | 6/2010 | Yoshida | ................. | 320/118 |
| 8,729,957 B2 * | 5/2014 | Deam | ................. | 327/538 |
| 8,922,169 B2 * | 12/2014 | Sugimura | ................. | 320/134 |
| 2006/0091854 A1 * | 5/2006 | Chen et al. | ................. | 320/116 |
| 2006/0214636 A1 * | 9/2006 | Arai et al. | ................. | 320/116 |

FOREIGN PATENT DOCUMENTS

JP    2009213196 A    9/2009

* cited by examiner

*Primary Examiner* — Naum B Levin
(74) *Attorney, Agent, or Firm* — Volentine & Whitt, PLLC

(57) ABSTRACT

A semiconductor circuit includes a drive component that includes first switching elements connected to discharge switching elements and resistive elements; and a drawing component. The first switching elements interconnect, in accordance with a drive time of the discharge switching elements, drive current sources that supply charge to control signal lines and the control signal lines. The drawing component draws charge with draw current sources in accordance with a draw time in which the drawing component draws the charge supplied from the drive component.

11 Claims, 13 Drawing Sheets

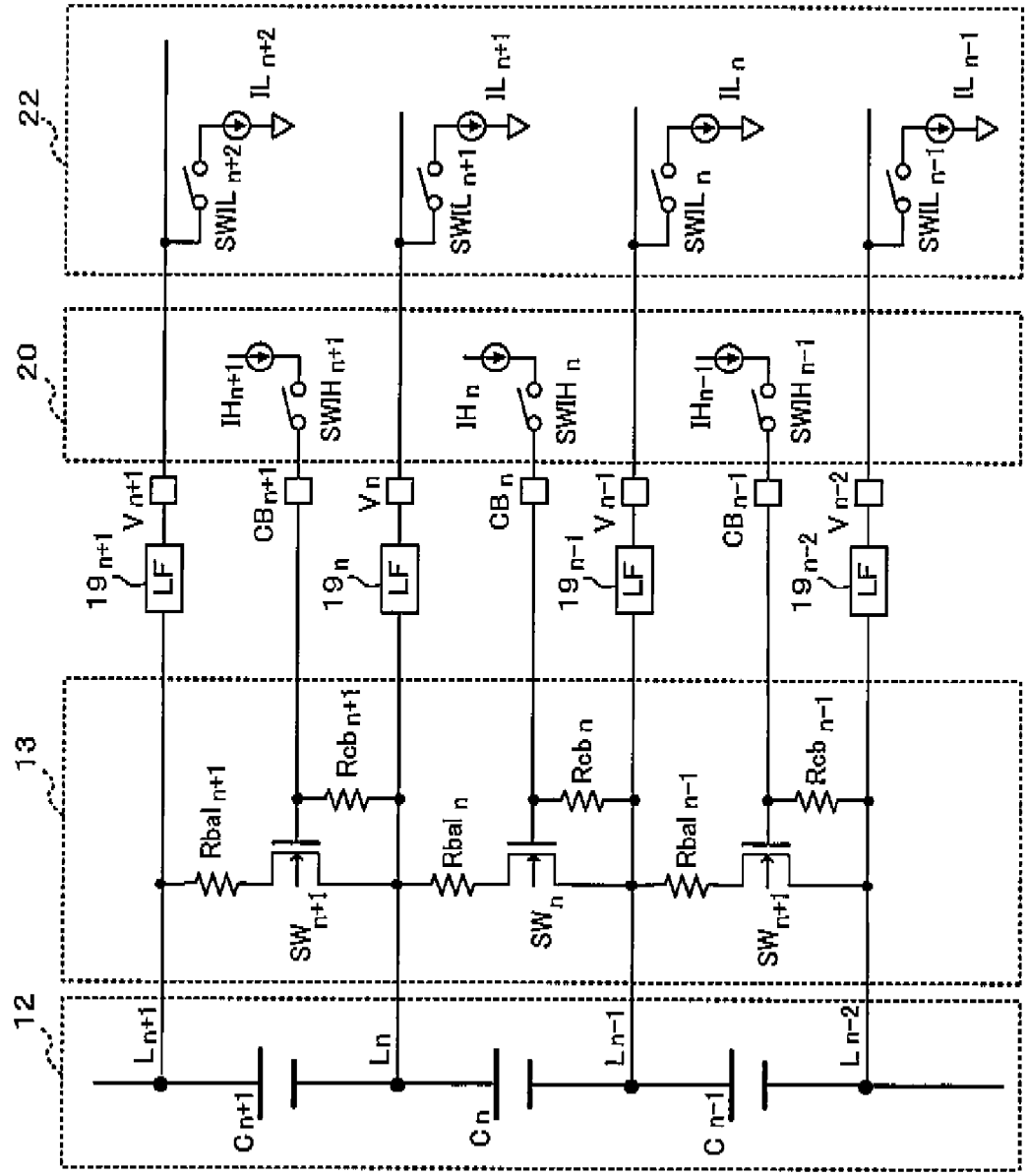

SEMICONDUCTOR CIRCUIT, BATTERY MONITORING SYSTEM, AND CONTROL METHOD

CROSS-REFERENCE TO RELATED APPLICATION

This application is based on and claims priority under 35 USC 119 from Japanese Patent Application No. 2011-206124 filed on Sep. 21, 2011, the disclosure of which is incorporated by reference herein.

BACKGROUND OF THE INVENTION

1. Field of the Invention

The present invention relates to a semiconductor circuit, a battery monitoring system, and a control method. The present invention specifically relates to a semiconductor circuit for monitoring battery voltages, a battery monitoring system, and a control method.

2. Description of the Related Art

Generally, batteries (specific examples include lithium-ion batteries) in which plural batteries (battery cells) are connected in series are used as large-capacity, high-output batteries used for driving motors in hybrid vehicles and electric vehicles.

In this kind of battery, there are cases where a difference occurs in the battery voltages between the batteries due to variations in the characteristics of the batteries, for example, such as in a case where the battery is repeatedly charged and discharged. Overcharge and overdischarge occur when the battery is used in a state in which a difference has occurred in the battery voltages, and there are cases where problems such as the life of the battery overall becoming shorter occur. For this reason, the battery voltages in the batteries are monitored with a battery monitoring system, and the battery voltages of the batteries are equalized by discharging any battery whose battery voltage is greater than the others.

For example, Japanese Patent Application Laid-Open (JP-A) No. 2009-213196 discloses a capacity regulating device (a battery monitoring system) that is equipped with a capacity adjusting circuit formed by capacity adjusting resistors connected in parallel to batteries and switching circuit elements connected in series to the capacity adjusting resistors. Thermistor elements are disposed between drive terminals of the switching circuit elements and one terminal each of the switching circuit elements connected to negative electrodes of the batteries. This technology discharges the batteries by switching on the switching circuit elements.

However, in the aforementioned technology, there are cases where variations occur in the battery voltages despite the discharge for equalizing the battery voltages of the batteries.

FIG. 13 illustrates a related art battery monitoring system 100. The related art battery monitoring system 100 is configured to include a battery cell group 112, a discharge circuit 113, and an equalization switching element drive circuit 121 that supplies charge to control terminals of equalization switching elements SW of the discharge circuit 113.

In the discharge circuit 113, the equalization switching elements SW and resistive elements Rbal, which are for limiting the discharge quantity and are connected in series between high potential sides and low potential sides of battery cells C, and resistive elements Rcb, which are pull-down resistors, are disposed for each battery.

In the battery monitoring system 100, in the case of performing discharge of the battery cells C, charge is supplied from the equalization switching element drive circuit 121 to gates of the equalization switching elements SW disposed for those battery cells C to thereby switch on the gates, whereby those battery cells C are short-circuited and discharged.

FIG. 13 illustrates a state in which the battery cell Cn is discharged. In the case of discharging the battery cell Cn, charge is supplied from the equalization switching element drive circuit 121 via a terminal CBn to the gate of the equalization switch element SWn (see the bold, solid arrow in FIG. 13). When the equalization switching element SWn is switched on, the high potential side and the low potential side of the battery cell Cn are short-circuited so that the battery cell Cn is discharged.

At this time, the charge supplied from the equalization switching element drive circuit 121 ends up being supplied via the resistive element Rcbn to the high potential side of the battery cell Cn−1 placed on the low potential side (see the bold, dashed arrow in FIG. 13). For this reason, the battery cell Cn−1 ends up being charged by the charge.

When the battery cell Cn−1 ends up being charged in this way, there are cases where the problem that the battery voltages of the battery cells end up varying occurs.

SUMMARY OF THE INVENTION

The present invention has been proposed in order to solve the problem described above, and it is an object thereof to provide a semiconductor circuit, a battery monitoring system, and a control method that may prevent variations in battery voltages resulting from discharge.

According to an aspect of the invention, there is provided a semiconductor circuit comprising: a drive component that includes first switching elements connected to discharge switching elements and resistive elements, the discharge switching elements being formed for each of plural batteries connected in series and in such a way that first ends of the discharge switching elements are connected to high potential sides of the batteries, second ends of the discharge switching elements are connected to low potential sides of the batteries, and control ends of the discharge switching elements are connected to control signal lines, the resistive elements being connected between the control signal lines and the low potential sides of the batteries, and the first switching elements interconnecting, in accordance with a drive time of the discharge switching elements, drive current sources that supply charge to the control signal lines and the control signal lines; and a drawing component that draws charge with draw current sources in accordance with a draw time in which the drawing component draws the charge supplied from the drive component.

According to another aspect of the invention, there is provided a battery monitoring system comprising: plural batteries that are connected in series; discharge switching elements that are formed for each of the plural batteries and in such a way that first ends of the discharge switching elements are connected to high potential sides of the batteries, second ends of the discharge switching elements are connected to low potential sides of the batteries, and control ends of the discharge switching elements are connected to control signal lines; resistive elements that are connected between the control signal lines and the low potential sides of the batteries; and a semiconductor circuit that drives the discharge switching elements, wherein the semiconductor circuit includes a drive component that includes first switching elements connected to discharge switching elements and resistive elements, with the discharge switching elements being formed for each of plural batteries connected in series such that first ends of the discharge switching elements are connected to high potential sides of the batteries, second ends of the discharge switching elements are connected to low potential sides of the batteries, and control ends of the discharge switching elements are connected to control signal lines, the resistive elements being connected between the control signal lines and the low potential sides of the batteries, and the first switching elements interconnecting, in accordance with a drive time of the discharge switching elements, drive current sources that supply charge to the control signal lines and the control signal lines, and a drawing component that draws charge with draw current sources in accordance with a draw time in which the drawing component draws the charge supplied from the drive component.

According to still another aspect of the invention, there is provided a control method comprising: with respect to a semiconductor circuit including a drive component that includes first switching elements connected to discharge switching elements and resistive elements, with the discharge switching elements being formed for each of plural batteries connected in series and in such a way that first ends of the discharge switching elements are connected to high potential sides of the batteries, second ends of the discharge switching elements are connected to low potential sides of the batteries, and control ends of the discharge switching elements are connected to control signal lines and with the resistive elements being connected between the control signal lines and the low potential sides of the batteries, and with the first switching elements interconnecting, in accordance with a drive time of the discharge switching elements, drive current sources that supply charge to the control signal lines and the control signal lines, and a drawing component that draws charge with draw current sources in accordance with a draw time in which the drawing component draws the charge supplied from the drive component, controlling so as to switch on the first switching elements during the drive time and controlling so as to switch on the second switching elements during the draw time.

According to the present invention, there is achieved the effect that variations in battery voltages resulting from discharge may be prevented.

BRIEF DESCRIPTION OF THE DRAWINGS

FIG. 6 is a circuit diagram illustrating still another example of the schematic configuration of the semiconductor circuit pertaining to the first embodiment;

DETAILED DESCRIPTION OF THE INVENTION

First Embodiment

A battery monitoring system 10 of a first embodiment will be described in detail below with reference to the drawings.

Figure 1:
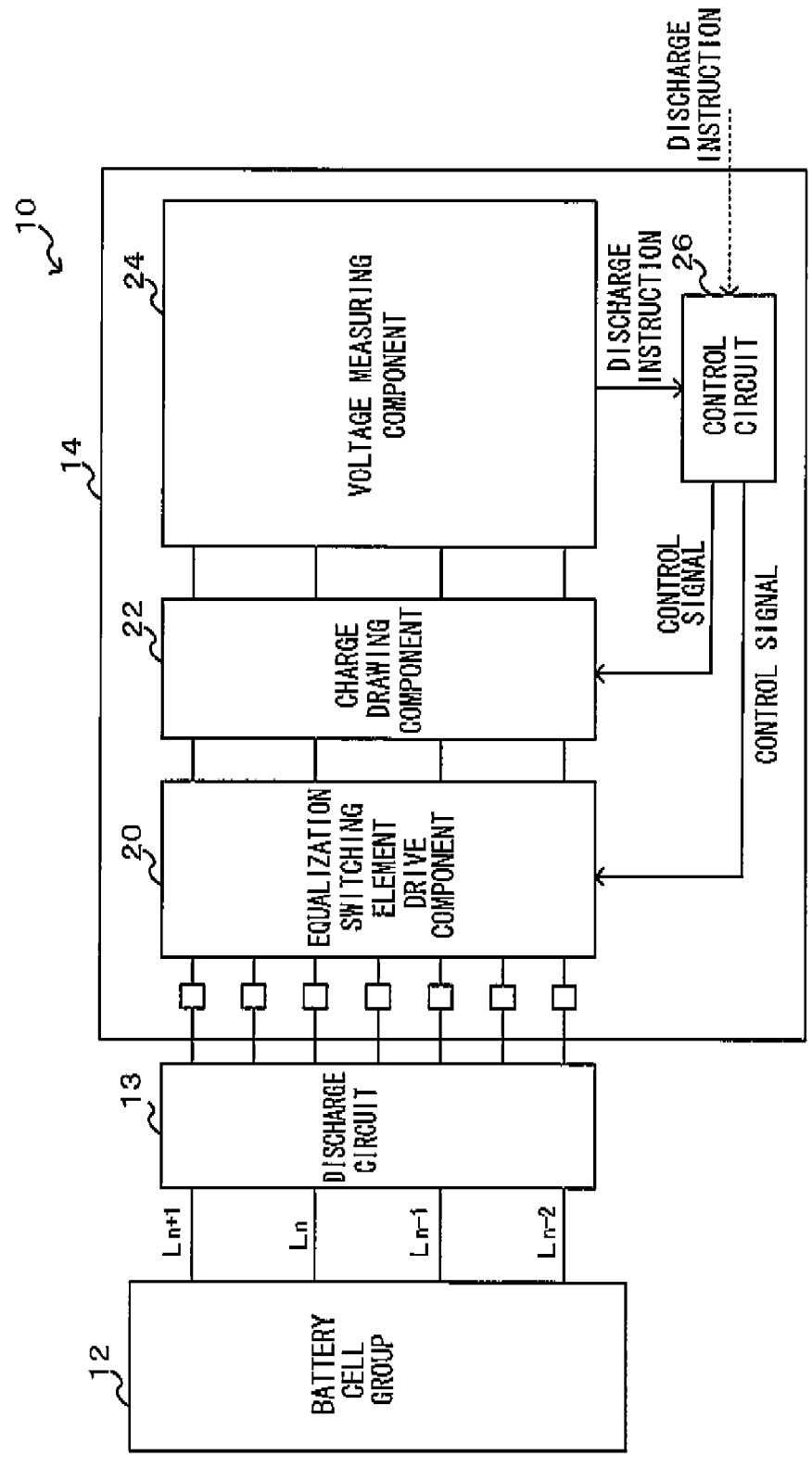
FIG. 1 is a circuit diagram illustrating an example of the schematic configuration of a battery monitoring system pertaining to a first embodiment.

First, the configuration of the battery monitoring system 10 of the present embodiment will be described. FIG. 1 illustrates an example of the schematic configuration of the battery monitoring system 10 of the present embodiment. The battery monitoring system 10 of the present embodiment illustrated in FIG. 1 is configured to include a battery cell group 12 in which plural battery cells C (see FIG. 2) are connected in series, a discharge circuit 13 that discharges the battery cells C in the battery cell group 12, and a semiconductor circuit 14 that measures the voltages of the battery cells C in the battery cell group 12.

The discharge circuit 13 is configured to include equalization switching elements SW (see FIG. 2) for discharging the battery cells C.

The semiconductor circuit 14 is configured to include an equalization switching element drive component 20, a charge drawing component 22, a voltage measuring component 24, and a control circuit 26. The equalization switching element drive component 20, the charge drawing component 22, the voltage measuring component 24, and the control circuit 26 are formed at one pitch on the same substrate.

The voltage measuring component 24 has the function of measuring the battery voltages of the battery cells C on the basis of the differences between the voltages on the high potential sides and the voltages on the low potential sides of the battery cells C. The battery monitoring system 10 of the present embodiment is configured in such a way that the voltage measuring component 24 outputs a discharge instruction to the control circuit 26 so as to discharge the overcharged battery cells C in order to equalize the battery voltages of the battery cells C on the basis of the battery voltage measurement result. The battery monitoring system 10 is not limited to this and may also be configured in such a way that a monitoring circuit that monitors the battery voltages of the battery cells C and outputs a discharge instruction to equalize the battery voltages on the basis of the measurement result of the voltage measuring component 24 is separately disposed (see the dashed arrow in FIG. 1).

The control circuit 26 is a logic circuit having a function for outputting control signals that control so as to switch on or off switching elements (SWIH, SWIL) of the equalization switching element drive component 20 and the charge drawing component 22 on the basis of the discharge instruction that is output from the voltage measuring component 24. When the control circuit 26 receives the discharge instruction, a program is executed so that the control circuit 26 outputs the control signals to the equalization switching element drive component 20 and the charge drawing component 22.

The equalization switching element drive component 20 has the function of driving the equalization switching elements SW of the discharge circuit 13. The charge drawing component 22 has the function of drawing charge supplied by the equalization switching element drive component 20 into the semiconductor circuit 14.

Figure 2:
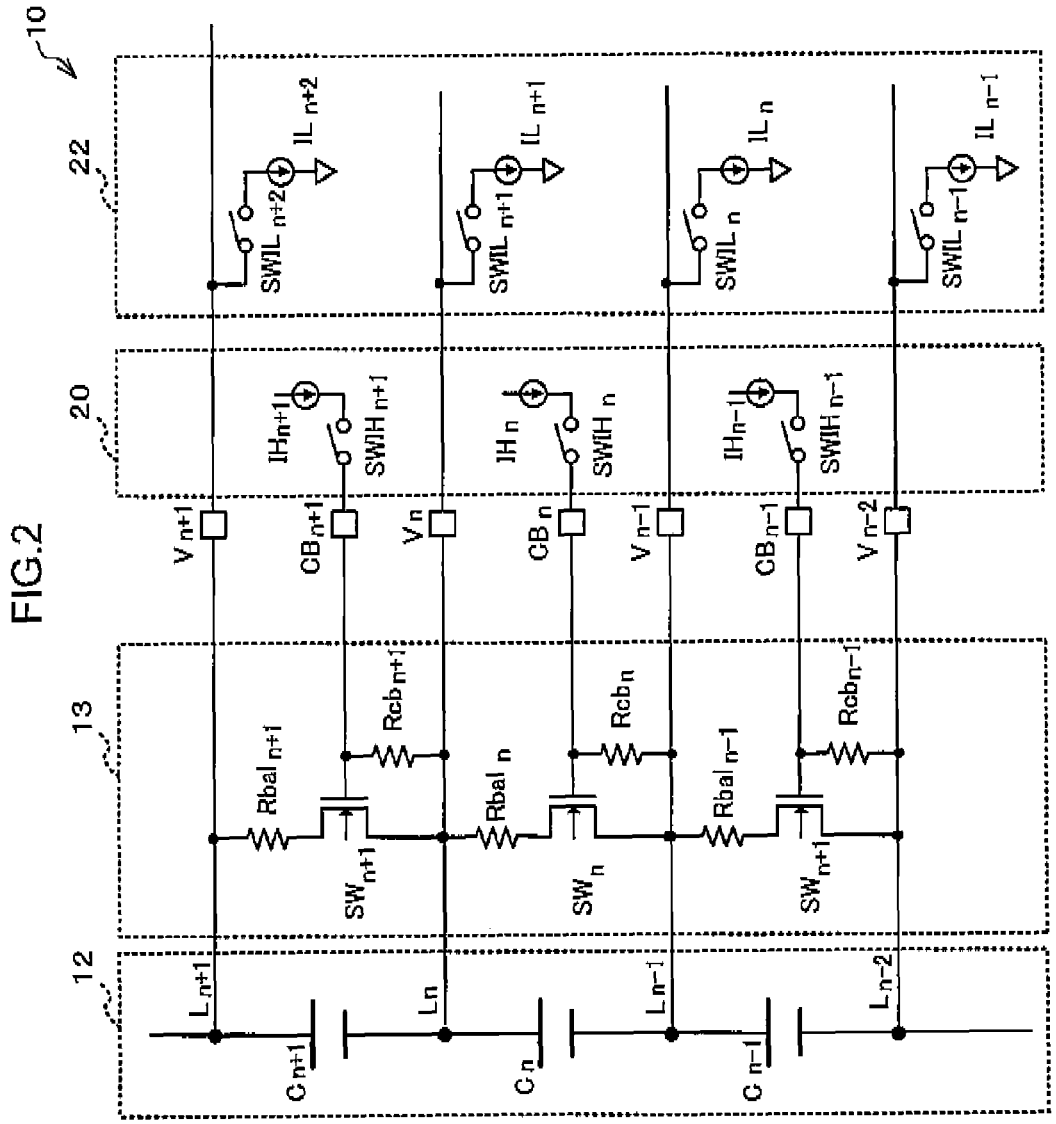
FIG. 2 is a circuit diagram illustrating an example of the schematic configuration of a semiconductor circuit pertaining to the first embodiment.

FIG. 2 illustrates an example of the configurations of the discharge circuit 13, the equalization switching element drive component 20, and the charge drawing component 22 of the present embodiment. In the present embodiment, as a specific example, the battery cell group 12 includes three cells C (Cn−1 to Cn+1; when referring to these collectively, they will be called "the battery cells C") and is connected by signal lines Ln−2 to Ln+1 (when referring to these collectively, they will be called "the signal lines L") via the discharge circuit 13 to the semiconductor circuit 14. The discharge circuit 13 of the present embodiment is connected via terminals (pads) V (Vn−2 to Vn+1; when referring to these collectively, they will be called "the terminals V") and terminals (pads) CB (CBn−1 to CBn+1; when referring to these collectively, they will be called "the terminals CB") to the semiconductor circuit 14.

The discharge circuit 13 of the present embodiment illustrated in FIG. 2 has the function of equalizing the battery voltages of the battery cells C by short-circuiting the high potential sides and the low potential sides of the battery cells C in the battery cell group 12 to thereby discharge the battery cells C. The discharge circuit 13 has the equalization switching elements SW (SWn−1 to SWn+1; when referring to these collectively, they will be called "the equalization switching elements SW"). In the present embodiment, the equalization switching elements SW use NMOS transistors as a specific example. The drains of the equalization switching elements SW are connected, via resistive elements Rbal (Rbaln−1 to Rbaln+1; when referring to these collectively, they will be called "the resistive elements Rbal") for limiting the discharge quantity of the battery cells C, to the signal lines L on the high potential sides of the battery cells C. The sources of the equalization switching elements SW are connected to the signal lines L on the low potential sides of the battery cells C. Further, the gates of the equalization switching elements SW are connected to the switching elements SWIH and are also connected, via resistive elements Rcb (Rcbn−1 to Rcbn+1; when referring to these collectively, they will be called "the resistive elements Rcb") that are pull-down resistors, to the signal lines L on the low potential sides. When the gates of the equalization switching elements SW are switched on, the high potential sides and the low potential sides of the battery cells C are short-circuited and the charge in the battery cells C is discharged. In the present embodiment, the gates of the equalization switching elements SW are switched on and off by the equalization switching element drive component 20.

The equalization switching element drive component 20 is equipped with constant current sources IH (IHn−1 to IHn+1; when referring to these collectively, they will be called "the constant current sources IH") and the switching elements SWIH (SWIHn−1 to SWIHn+1; when referring to these collectively, they will be called "the switching elements SWIH") for each of the battery cells C.

The switching elements SWIH have the function of interconnecting the constant current sources IH and the gates of the equalization switching elements SW of the discharge circuit 13 via the terminals (pads) CB. When performing discharge (equalization) of the battery cells C, the switching elements SWIH are switched on in response to the control signal from the control circuit 26 to thereby allow charge to be supplied from the constant current sources IH to the gates of the equalization switching elements SW.

That is when the switching elements SWIH of the equalization switching element drive component 20 are switched on, charge is supplied from the constant current sources IH to the gates of the equalization switching elements SW, the equalization switching elements SW are switched on, the high potential sides and the low potential sides of the battery cells C are short-circuited, and the charge is discharged from the battery cells C.

The charge drawing component 22 of the present embodiment is equipped with constant current sources IL (ILn−1 to ILn+1; when referring to these collectively, they will be called "the constant current sources IL") and the switching elements SWIL (SWILn−1 to SWIL+1; when referring to these collectively, they will be called "the switching elements SWIL") for each of the battery cells C.

The constant current sources IL are connected to a ground. In the present embodiment, the ground is the substrate (chip) ground of the semiconductor circuit 14. Here, as an example, the ground has the minimum potential in the substrate (chip). The switching elements SWIL have the function of interconnecting the constant current sources IL and the signal lines L connected to the low potential sides of the battery cells C via the terminals (pads) V. When discharge (equalization) of the battery cells C is performed, the switching elements SWIL are switched on in response to the control signal of the control circuit 26 and the charge is drawn to the ground via the signal lines L by the constant current sources IL.

Figure 3:
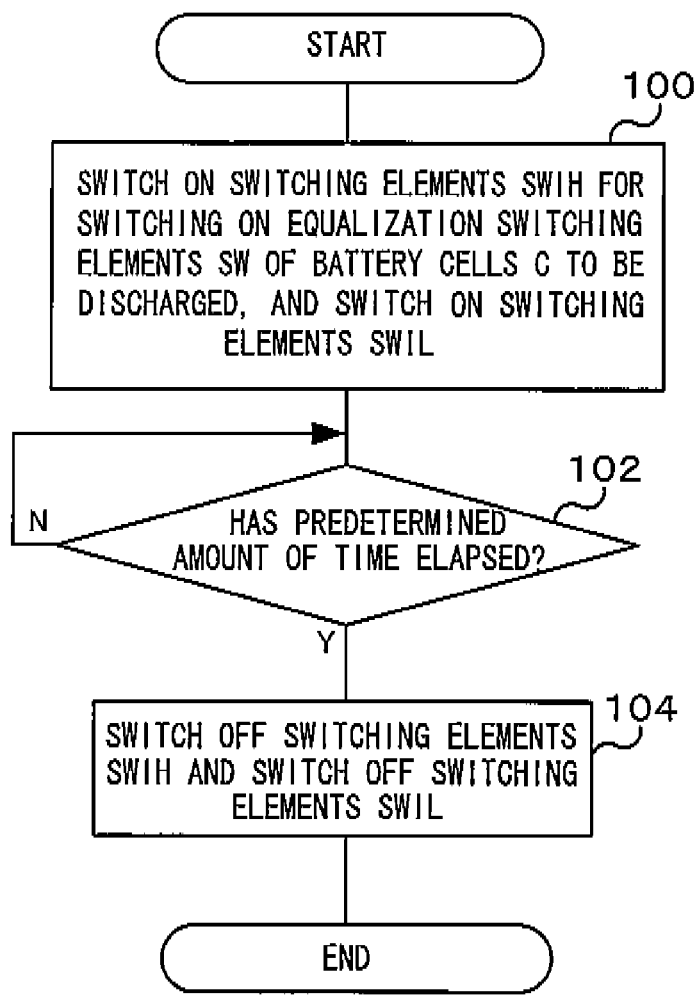
FIG. 3 is a flowchart illustrating an example of the flow of a discharge action pertaining to the first embodiment.
Figure 4:
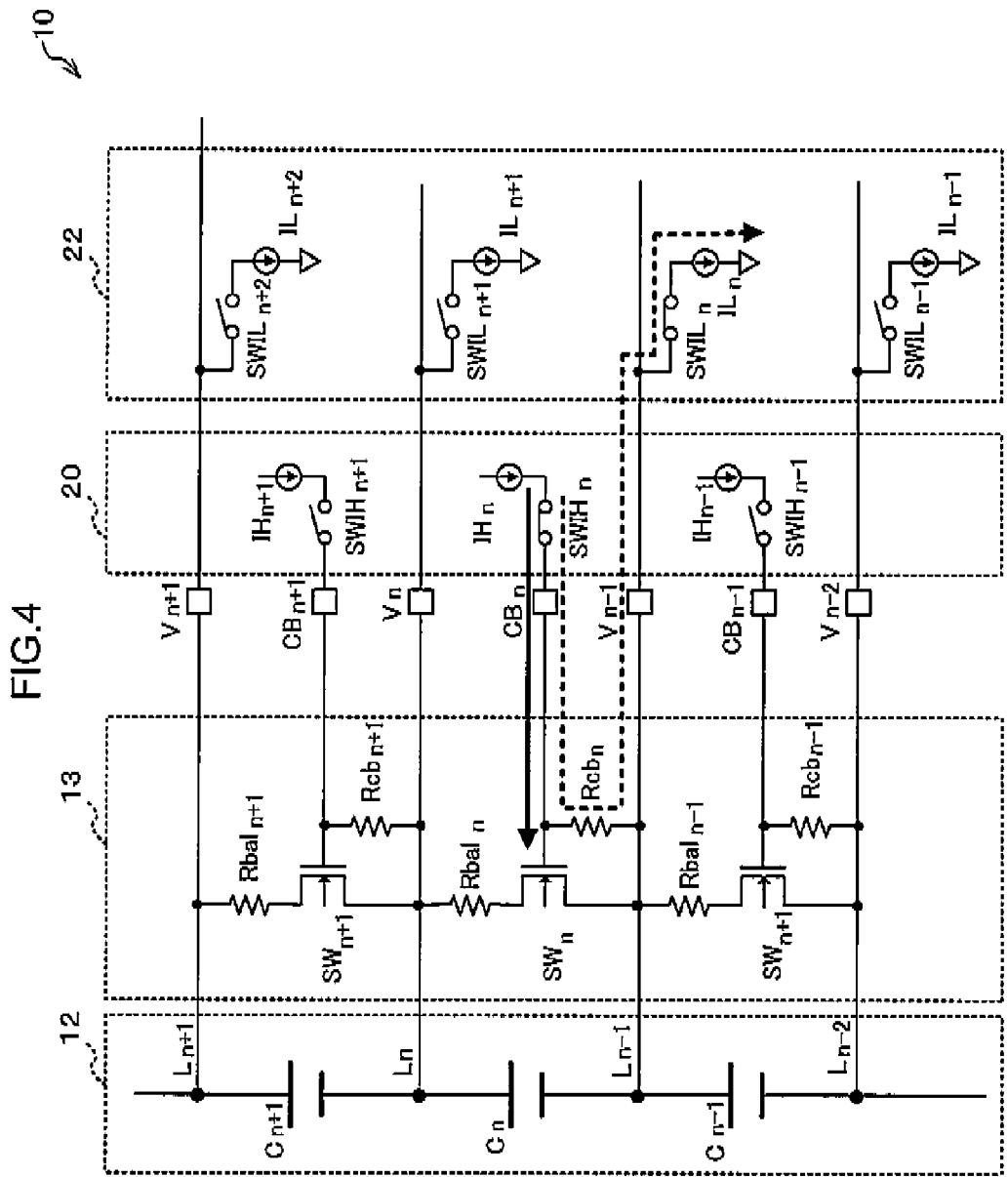
FIG. 4 is a circuit diagram illustrating the state of the semiconductor circuit during the discharge action pertaining to the first embodiment.

Next, actions during the discharge of the battery cells C will be described. FIG. 3 is a flowchart illustrating an example of a flow of actions during the discharge of the battery cells C of the present embodiment. The actions are controlled by the control circuit 26 by executing a program, for example. Below, a case of discharging the battery cell Cn will be described as a specific example. FIG. 4 is a circuit diagram illustrating the state of the battery monitoring system 10 (the semiconductor circuit 14) in the case of the specific example.

First, the voltage measuring component 24 measures the battery voltages of the battery cells C. Because the battery cells C were in an overcharged state, the discharge instruction is outputted to the control circuit 26 so as to discharge the charge equal to the overcharge (the difference for equalization). The control circuit 26 outputs the control signals to the equalization switching element drive component 20 and the charge drawing component 22 in response to the discharge instruction for discharging the charge equal to the overcharge (the difference for equalization).

First, in step 100, the control circuit 26 switches on the switching elements SWIH of the equalization switching element drive component 20 for switching on the equalization switching elements SW corresponding to the battery cells C to be discharged.

As a specific example, the control circuit 26 switches on the switching element SWIHn. Because of this, charge is supplied from the constant current source IHn to the gate of the equalization switching element SWn (see the bold, solid arrow in FIG. 4), and the equalization switching element SWn is switched on. When the equalization switching element SWn is switched on, the battery cell Cn is short-circuited and charge is discharged. At this time, the charge supplied from the constant current source IHn flows to the signal line Ln−1 via the resistive element Rcbn.

Therefore, in step 100 of the present embodiment, the control circuit 26 switches on the switching elements SWIL (the constant current sources IL connected to the signal lines L on the low potential sides of the battery cells C) corresponding to the battery cells C to be discharged. As a specific example, the control circuit 26 switches on the switching element SWILn. Because of this, the constant current source ILn and the signal line Ln−1 become interconnected via the terminal Vn−1. Consequently, the charge flowing into the signal line Ln−1 is drawn to the ground by the constant current source ILn (see the bold, dashed arrow in FIG. 4).

In the next step 102, the control circuit 26 judges whether or not a predetermined amount of time has elapsed. In the present embodiment, the discharge time is determined beforehand as the predetermined amount of time in accordance with the charge quantity to be discharged. In a case where the predetermined amount of time has not elapsed, the discharge is not yet complete, so the answer is NO and the control circuit 26 stands by. On the other hand, in a case where the predetermined amount of time has elapsed, the discharge is complete, so the answer is YES and the control circuit 26 advances to step 104.

In step 104, the control circuit 26 switches off the switching elements SWIH and the switching elements SWIL that are on and thereafter ends the processing. As a specific example, the control circuit 26 switches off the switching element SWIHn and the switching element SWILn and thereafter ends the processing.

As described above, in the present embodiment, the semiconductor circuit 14 of the battery monitoring system 10 equipped with the discharge circuit 13 equipped with the equalization switching elements SW, the resistive elements Rbal for limiting the discharge quantity of the battery cells C, and the resistive elements Rcb that are pull-down resistors is equipped with: the equalization switching element drive component 20 that supplies charge to the gates of the equalization switching elements SW; and the charge drawing component 22 that includes the constant current sources IL for drawing the charge to the ground and the switching elements SWIL that interconnect the constant current sources IL and the signal lines L.

When discharging the battery cell en, the switching element SWIHn of the equalization switching element drive component 20 is switched on and charge is supplied from the constant current source IHn to the gate of the equalization switching element SWn. At the same time (also including at substantially the same time) as when the switching element SWIHn is switched on, the switching element SWILn of the charge drawing component 22 is switched on so that the signal line Ln−1 and the constant current source ILn become interconnected via the terminal Vn−1. Because of this, the charge flowing into the signal line Ln−1 from the constant current source IHn via the resistive element Rcbn may be drawn to the ground.

When the discharge ends, the switching element SWIHn of the equalization switching element drive component 20 and the switching element SWILn of the charge drawing component 22 are switched off at the same time (also including at substantially the same time).

In this way, in the present embodiment, when discharging the battery cell Cn, the charge flowing into the signal line Ln−1 is drawn to the ground by the charge drawing component 22, so the charge may be suppressed from flowing to the high potential side of the battery cell Cn−1 via the signal line Ln−1, and the battery cell Cn−1 may be prevented from ending up being charged as a result of the charge flowing to the high potential side of the battery cell Cn−1. Consequently, variations in the battery voltages of the battery cells C resulting from discharge may be prevented.

In case where the charge drawing component 22 has drawn more charge than the inflowing charge quantity, the battery cell C on the lower side (the battery cell Cn−1) is discharged (the battery voltage decreases). On the other hand, in a case where the charge drawing component 22 has drawn less charge than the inflowing charge quantity, the battery cell C on the lower side (the battery cell Cn−1) is charged (the battery voltage increases) by the remaining charge that was not drawn. For that reason, some variation occurs in the battery voltages of the battery cells C. Consequently, it is preferred that the charge quantity of the charge drawn by the charge drawing component 22 be equal to the charge quantity flowing into the signal lines L (Ln−1 in the above specific example).

In the above embodiment, in order to make the charge quantity of the charge drawn in and the charge quantity flowing into the signal line Ln−1 equal the current values of the constant current source IHn and the constant current source ILn are made equal and the switching element SWIHn and the switching element SWILn are switched on and off at the same time. In a case where the current values of the constant current source IHn and the constant current source ILn are equal to each other, it is best for the amounts of time in which the switching element SWIHn and the switching element SWILn are switched on to be equal. The timings when the switching element SWIHn and the switching element SWILn are switched on and off may also be such that the switching element SWILn is switched on and off later than rather than at the same time as, the switching element SWIHn. In this way, in a case where the switching element SWILn is switched on later, the charge supplied by the constant current source IHn flows to the high potential side of the battery cell Cn, but the inflowing charge is drawn to the ground by the constant current source ILn when the switching element SWILn is switched on.

In a case where the current values of the constant current source IHn and the constant current source ILn are not equal, the on-time of the switching element SWIHn and the on-time of the switching element SWILn should be made different in such a way that, for example, the current value of the constant current source IHn multiplied by the on-time of the switching element SWIHn becomes equal to the current value of the switching element SWIHn multiplied by the on-time of the switching element SWILn, so that the charge quantities become equal.

The discharge circuit 13 is not limited to the configuration illustrated in FIG. 2. The discharge circuit 13 may be equipped with the equalization switching elements SW, the resistive elements Rbal for limiting the discharge quantity of the battery cells C, and the resistive elements Rcb that are pull-down resistors. For example, in order to limit the discharge quantity (the charge quantity to be discharged), disposing the resistive elements Rbal is preferred but it is alright if the resistive elements Rbal are not disposed.

Figure 5:
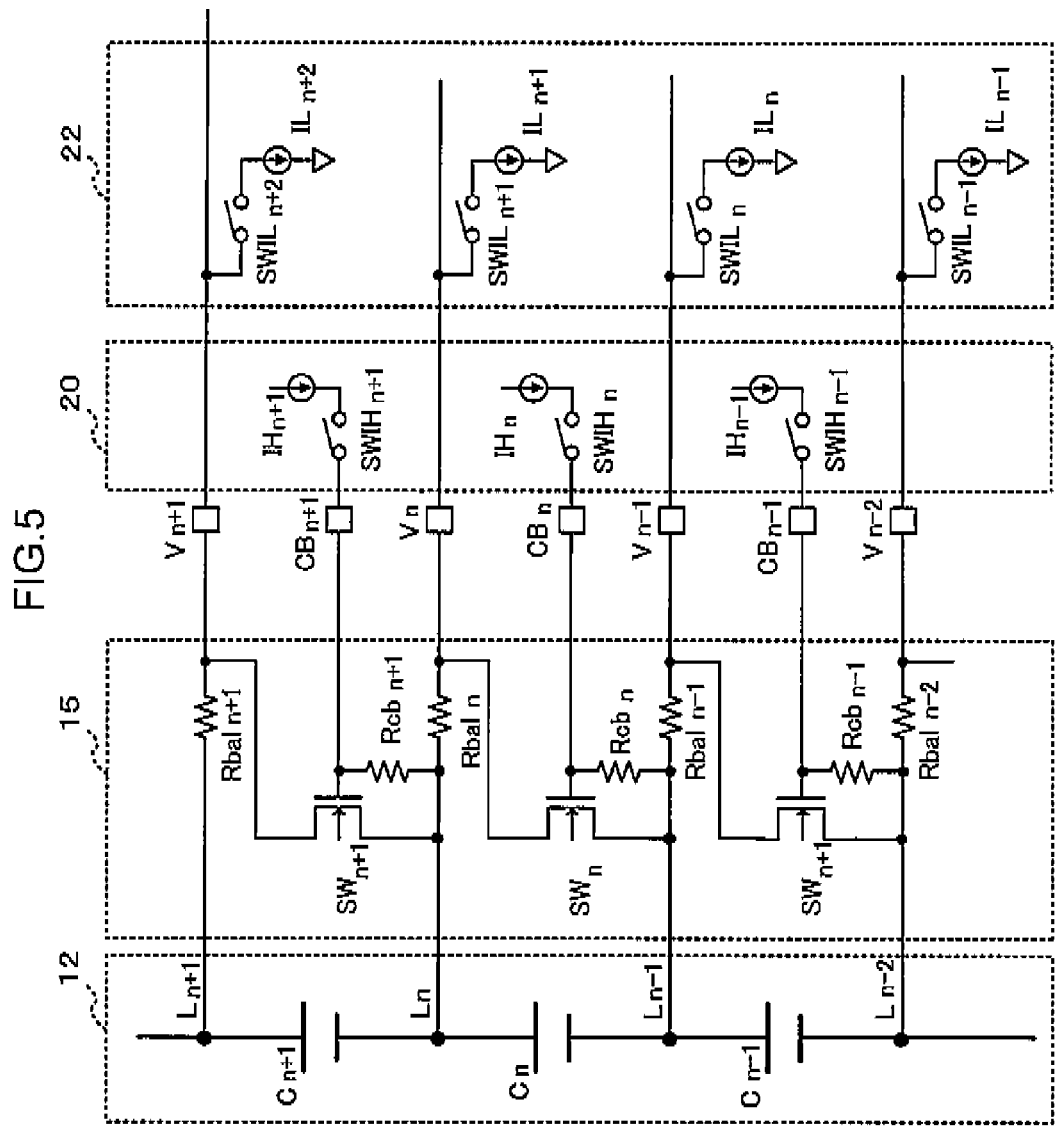
FIG. 5 is a circuit diagram illustrating another example of the schematic configuration of the semiconductor circuit (discharge circuit) pertaining to the first embodiment.

FIG. 5 illustrates a modification of the discharge circuit 13. In a discharge circuit 15 of FIG. 5, the positions where the resistive elements Rbal are disposed differ from those in the discharge circuit 13 illustrated in FIG. 2. In the discharge circuit 15 illustrated in FIG. 5, the resistive elements Rbal are disposed between the terminals V and the points of connection between the resistive elements Rcb corresponding to the battery cells C on the upper sides and the signal lines L. As a specific example, the resistive element Rbaln that controls the discharge quantity of the battery cell Cn is disposed between the terminal Vn and the point of connection between the resistive element Rcbn+1 and the signal line Ln. Even in a case where the discharge circuit 15 is configured in this way, the configurations and actions of the equalization switching element drive component 20 and the charge drawing component 22 are substantially the same as the configurations and actions described above. In the case of the discharge circuit 15, when the charge is drawn by the charge drawing component 22, the charge is drawn via the resistive elements Rbal, so there are cases where, because of the resistive elements Rbal, voltage drop occurs and it becomes difficult to draw the charge. In such a case, the current value of the constant current sources IL of the charge drawing component 22 should be reduced and the on-time of the switching elements SWIL should be lengthened.

Figure 7A:
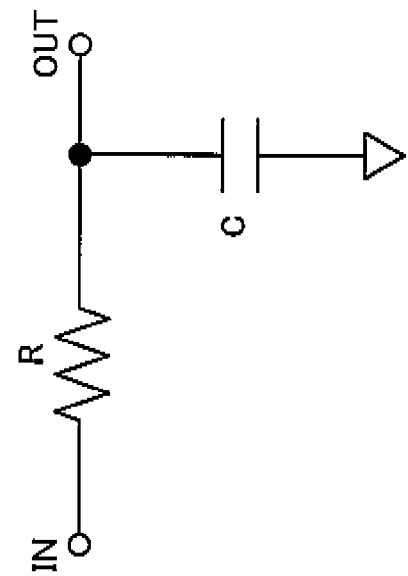
FIG. 7A is a circuit diagram for describing an example of the configuration of a low-pass filter and illustrates a case where the low-pass filter is configured by a resistive element and a capacitive element.
Figure 7B:
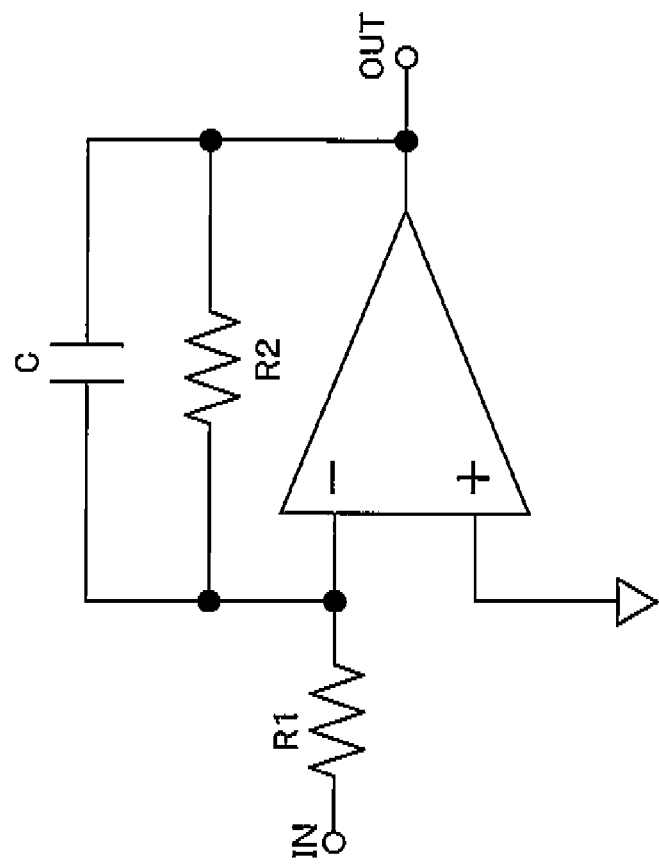
FIG. 7B is a circuit diagram for describing another example of the configuration of a low-pass filter and illustrates a case where the low-pass filter is configured by resistive elements, a capacitive element, and an op-amp.

Further, as illustrated in FIG. 6, low-pass filters (LF) 19 ($19n+1$ to $19n-1$; when referring to these collectively, they will be called "the low-pass filters 19") may also be disposed after the discharge circuit 13 on the signal lines L on the high potential sides of the battery cells C. The low-pass filters 19 have the function of suppressing precipitous voltage fluctuations occurring in the battery cells C in the battery cell group 12 by cutting off the high-frequency component. The configuration of the low-pass filters 19 is not limited. For example, the low-pass filters 19 may be configured by a resistive element R and a capacitive element C as illustrated in FIG. 7A or may be configured by resistive elements R1 and R2, a capacitive element C, and an op-amp as illustrated in FIG. 7B.

In a case where the battery monitoring system 10 is equipped with the low-pass filters 19 as illustrated in FIG. 6, when the switching elements SWIH of the equalization switching element drive component 20 and the switching elements SWIL of the charge drawing component 22 are switched on at the same time, the charge drawing component 22 draws the charge stored in the capacitive elements (see the capacitive elements C in FIG. 7A and FIG. 7B) included in the low-pass filters 19 before drawing the charge flowing into the signal lines L from the constant current sources IH of the equalization switching element drive component 20. For that reason, the charge quantity of the charge stored in the capacitive elements of the low-pass filters 19 temporarily decreases, but the charge flowing into the signal lines L is drawn in and the storage quantity returns to what it was before.

Figure 8:
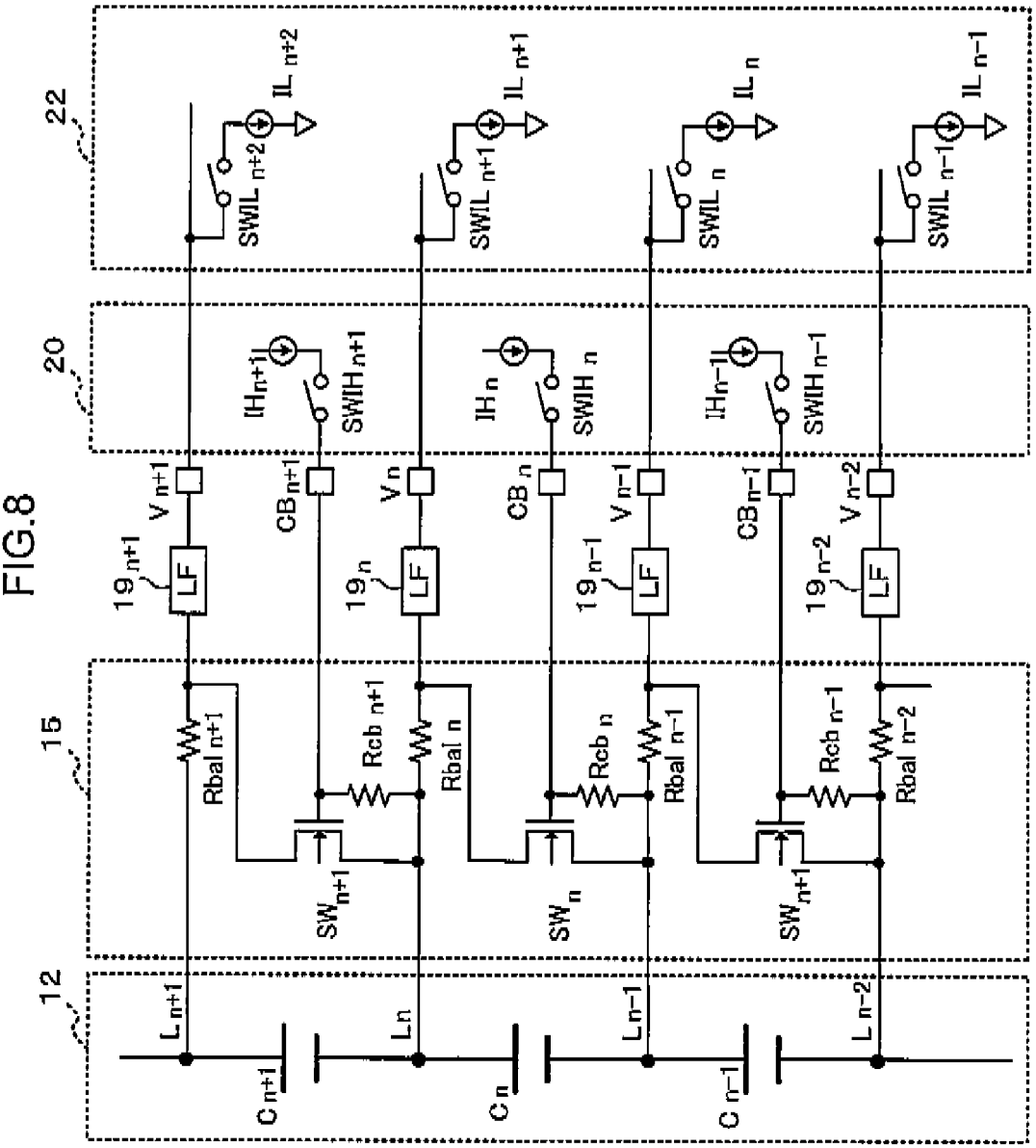
FIG. 8 is a circuit diagram illustrating still another example of the schematic configuration of the semiconductor circuit pertaining to the first embodiment.

Further, the battery monitoring system 10 may also be configured in such a way that the discharge circuit 15 illustrated in FIG. 5 and the low-pass filters 19 illustrated in FIG. 6 are combined. FIG. 8 illustrates such a case. It goes without saying that it is preferred that the actions in this case be the combined actions of the actions in FIG. 5 and the actions in FIG. 6.

Second Embodiment

A semiconductor circuit in a battery monitoring system of a second embodiment of the present invention will be described below with reference to the drawings. In the semiconductor circuit of the present embodiment, the charge drawing component differs from the charge drawing component 22 of the first embodiment. Therefore, here, configurations and actions that differ will be described, and when configurations and actions are substantially the same as those in the first embodiment, indication thereof will be given and detailed description will be omitted.

Figure 9:
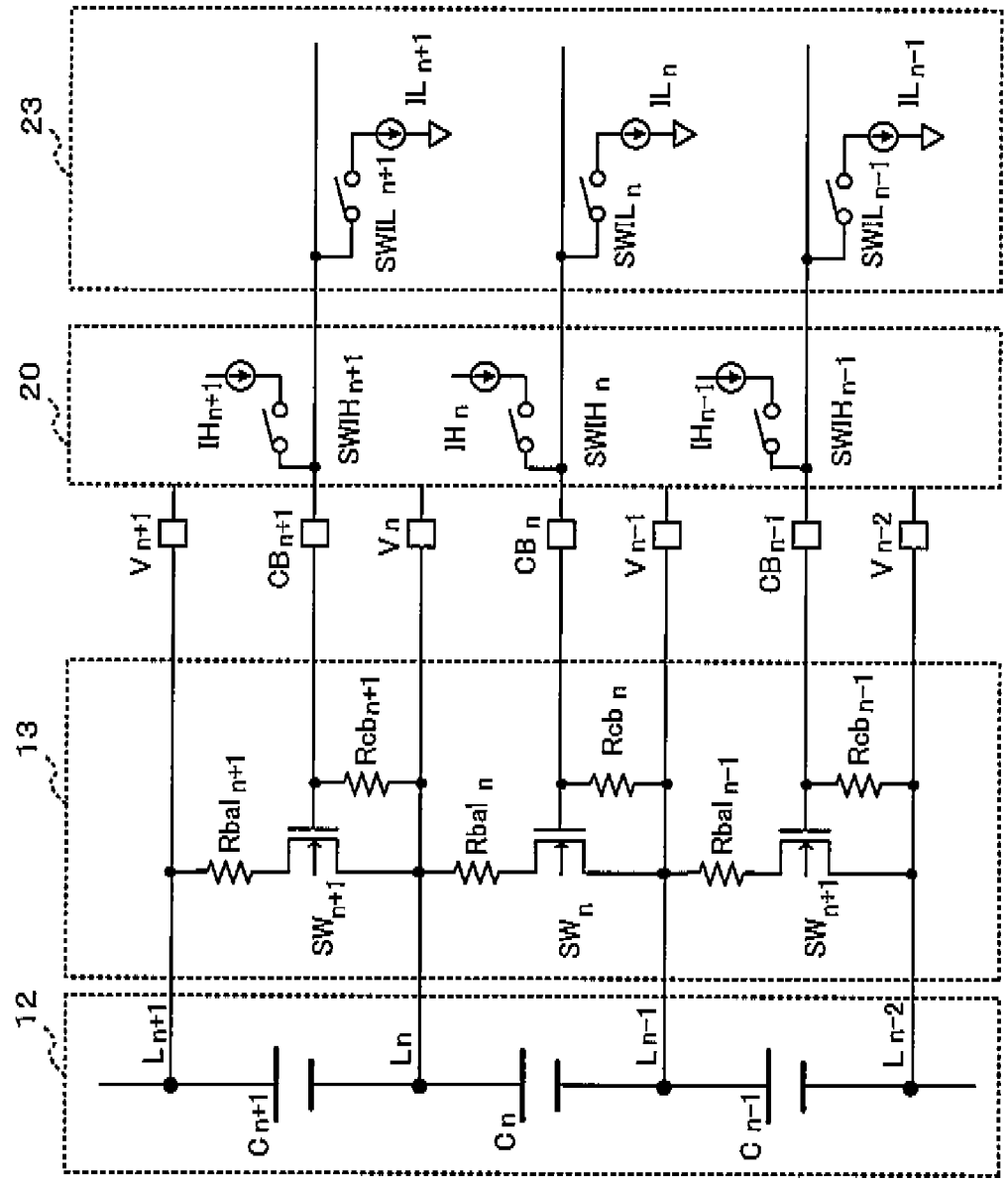
FIG. 9 is a circuit diagram illustrating an example of the schematic configuration of a semiconductor circuit pertaining to a second embodiment.

FIG. 9 illustrates an example of the configurations of the discharge circuit, the equalization switching element drive component, and the charge drawing component of the present embodiment. In the present embodiment, the semiconductor circuit 14 is equipped with a charge drawing component 23 instead of the charge drawing component 22 of the first embodiment.

The configuration and actions of the equalization switching element drive component 20 are substantially the same as those in the first embodiment.

The charge drawing component 23 of the present embodiment is, like the charge drawing component 22 of the first embodiment, equipped with constant current sources IL and switching elements SWIL for each of the battery cells C. The switching elements SWIL are connected to the gates of the equalization switching elements SW of the battery cells C and have the function of interconnecting, via the terminals CB, the constant current sources IL and control signal lines (CB) used when supplying charge from the constant current sources IH of the equalization switching element drive component 20. When discharge (equalization) of the battery cells C is performed, the switching elements SWIL are switched on in response to the control signal of the control circuit 26, and the constant current sources IL draw the charge to the ground via the signal lines L, the resistive elements Rcb, and the control signal lines CB.

Figure 10:
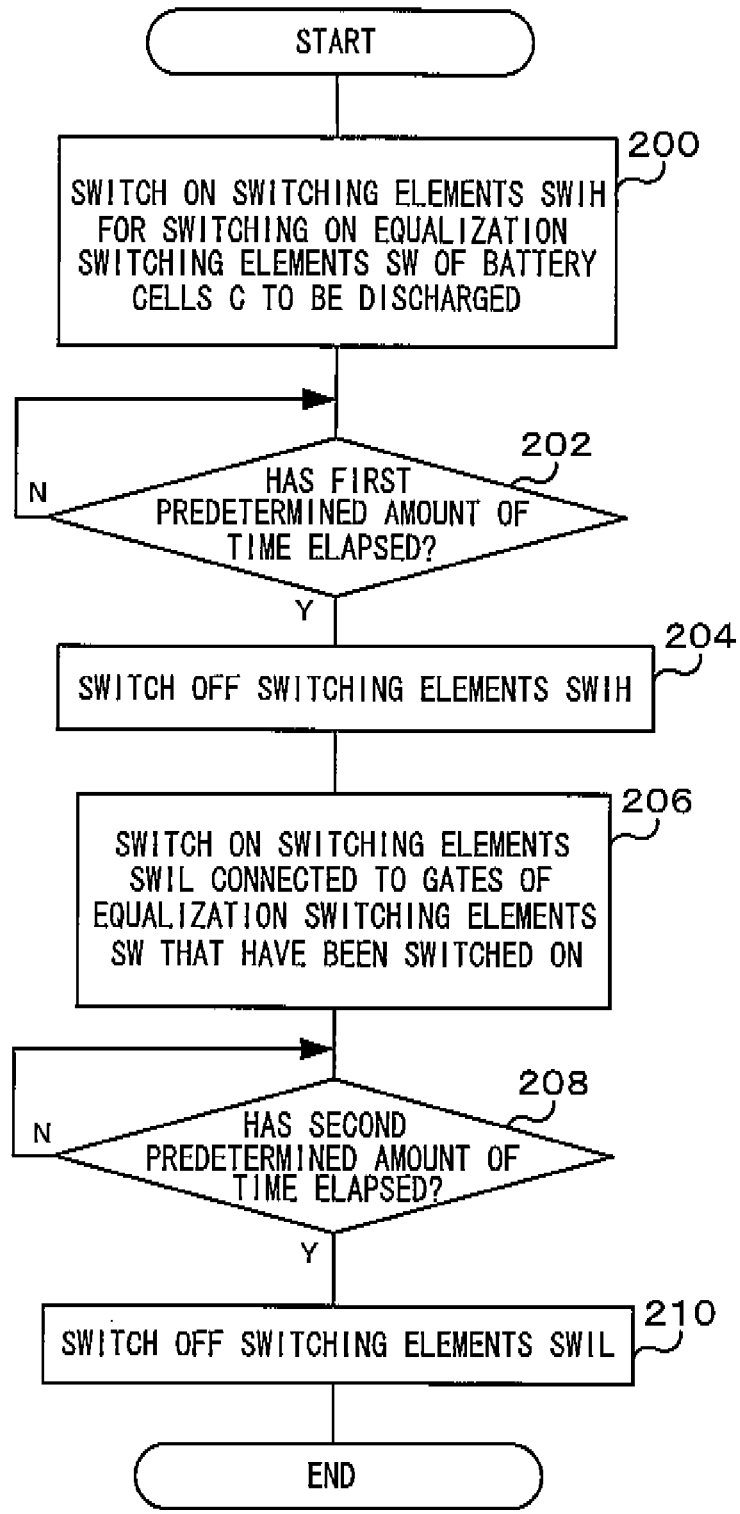
FIG. 10 is a flowchart illustrating an example of the flow of a discharge action pertaining to the second embodiment.
Figure 11:
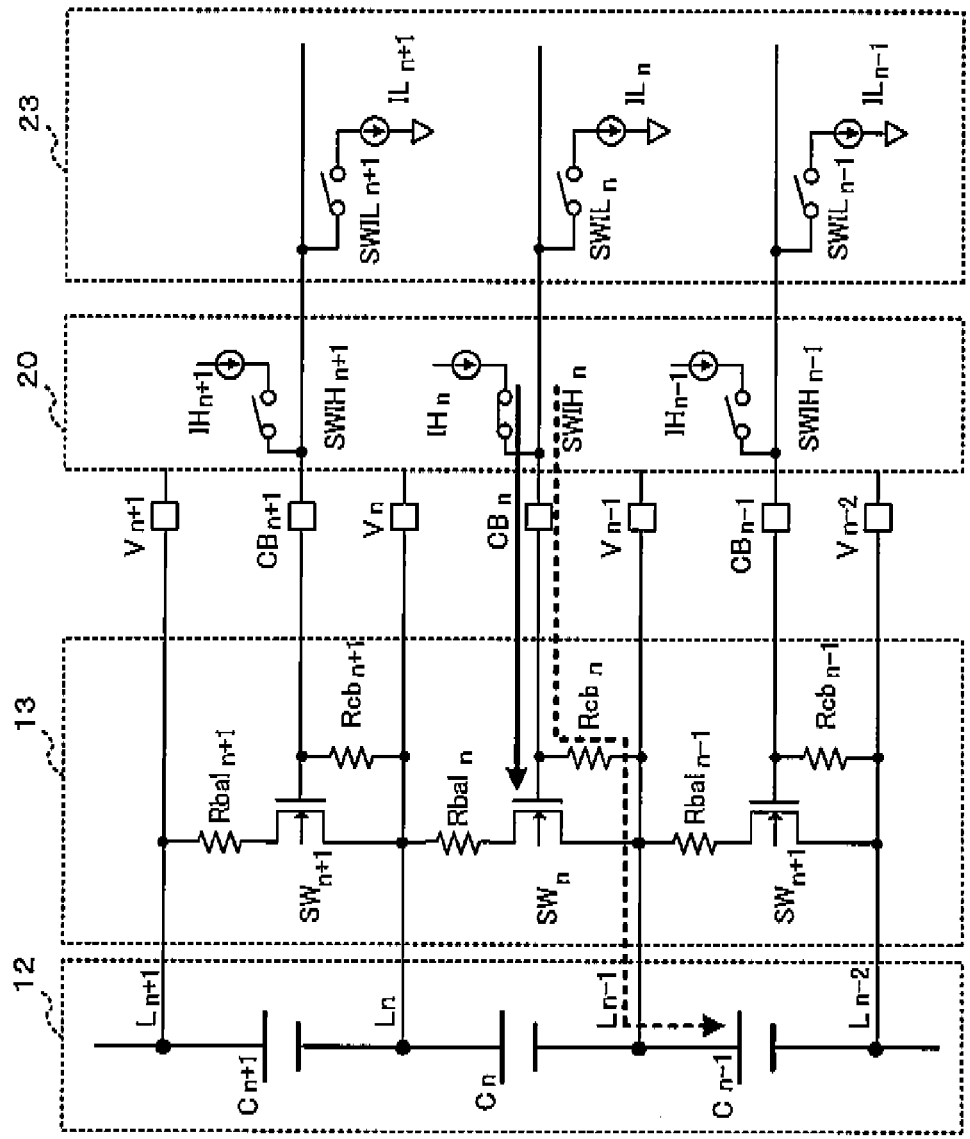
FIG. 11 is a circuit diagram illustrating the state of the semiconductor circuit during the discharge action pertaining to the second embodiment.
Figure 12:
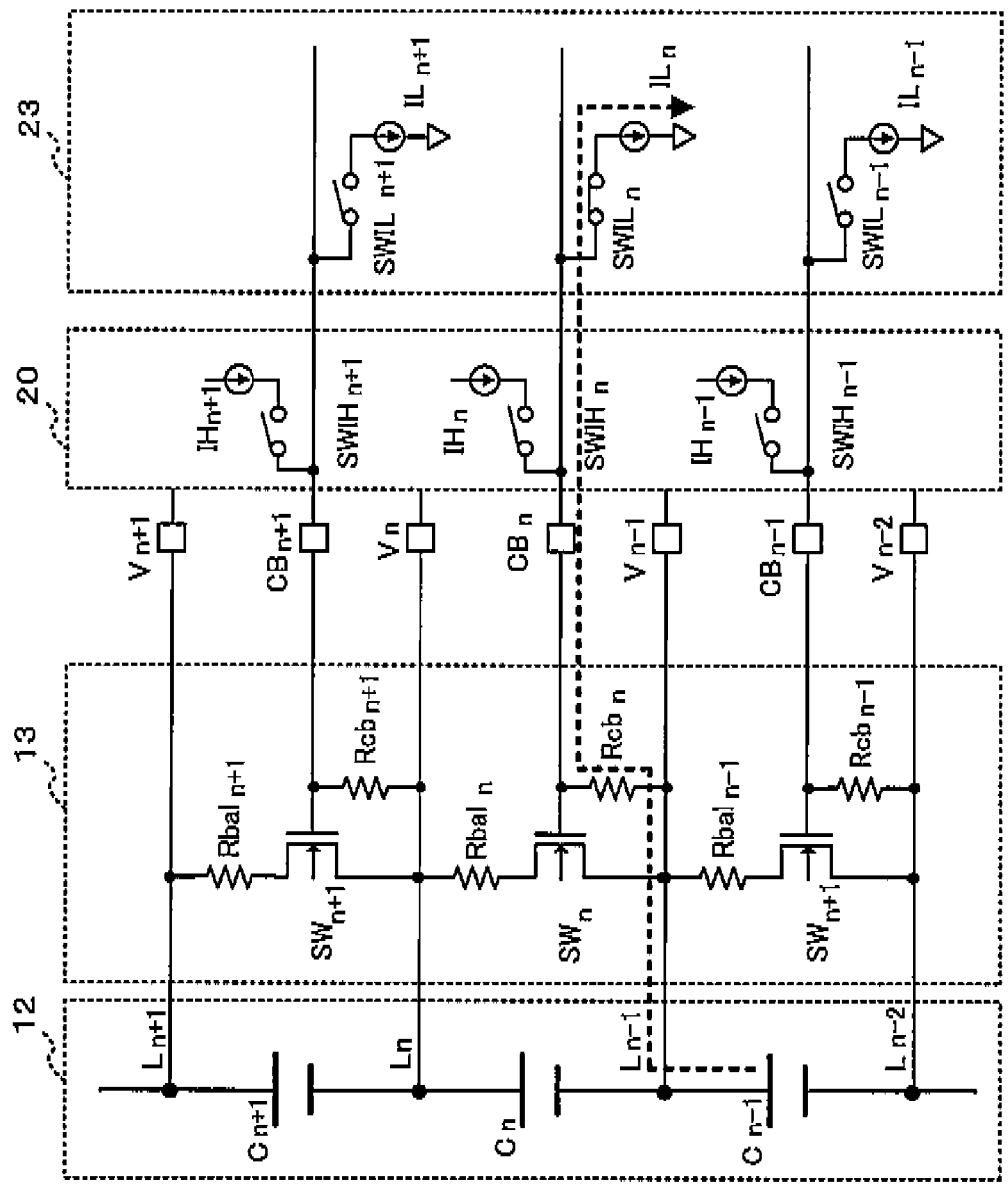
FIG. 12 is a circuit diagram illustrating the state of the semiconductor circuit during the discharge action pertaining to the second embodiment.
Figure 13:
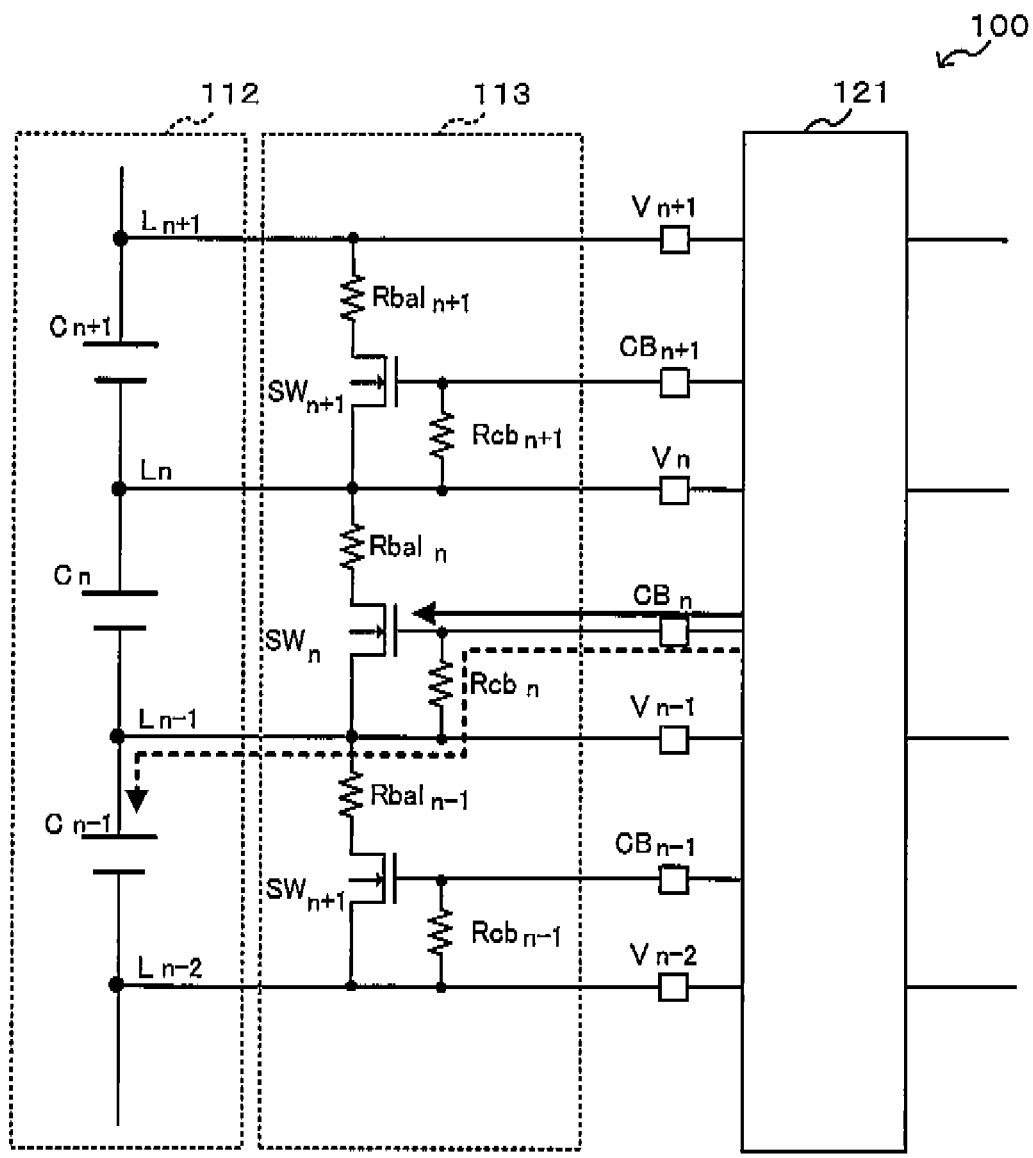
FIG. 13 is a circuit diagram illustrating an example of the schematic configuration of a related art battery monitoring system.

Next, the actions during the discharge of the battery cells C in the present embodiment will be described. FIG. 10 is a flowchart illustrating an example of the flow of actions during the discharge of the battery cells C of the present embodiment. A case of discharging the battery cell Cu will be described below as a specific example. Further, FIG. 11 and FIG. 12 are circuit diagrams illustrating the states of the battery monitoring system 10 (the semiconductor circuit 14) in the case of the specific example.

When the discharge instruction is input from the voltage measuring component 24, the control circuit 26 outputs the control signals to the equalization switching element drive component 20 and the charge drawing component 23 and executes the following actions.

First, in step 200, the control circuit 26 switches on the switching elements SWIH of the equalization switching element drive component 20 for switching on the equalization switching elements SW corresponding to the battery cells C to be discharged.

As a specific example, the control circuit 26 switches on the switching element SWIHn. Because of this, charge is supplied from the constant current source IHn to the gate of the equalization switching element SW (see the bold, solid arrow in FIG. 11), and the equalization switching element SWn is switched on. When the equalization switching element SWn is switched on, the battery cell Cu is short-circuited and charge is discharged. At this time, the charge supplied from the constant current source IHn flows to the high potential side of the battery cell Cn-1 via the resistive element Rcbn and the signal line Ln-1.

In the next step 202, the control circuit 26 judges whether or not a first predetermined amount of time has elapsed. In the present embodiment, as described above, the discharge time is determined beforehand as the predetermined amount of time in accordance with the charge quantity to be discharged. This predetermined amount of time is used as the first predetermined amount of time. In a case where the first predetermined amount of time has not elapsed, the discharge is not yet complete, so the answer is NO and the control circuit 26 stands by. On the other hand, in a case where the first predetermined amount of time has elapsed, the discharge is complete, so the answer is YES and the control circuit 26 advances to step 204.

In step 204, the control circuit 26 switches off the switching elements SWIM that are on. As a specific example, the control circuit 26 switches off the switching element SWILn. When the equalization switching elements SWIH are switched off, the equalization switching elements SW are switched off.

Thereafter, in the next step 206, the control circuit 26 switches on the switching elements SWIL of the charge drawing component 23 connected to the gates (the control signal lines CB) of the equalization switching elements SW that were switched on by the processing of step 200. In the present embodiment, because the equalization switching element drive component 20 (the constant current sources IH) and the charge drawing component 23 (the constant current sources IL) are connected to the same control signal lines CB, the control circuit 26 switches off the switching elements SWIH of the equalization switching element drive component 20, switches off the equalization switching elements SW, and thereafter switches on the switching elements SWIL of the charge drawing component 23.

As a specific example, the control circuit 26 switches on the switching element SWILn. Because of this, the constant current source ILn and the control signal line CBn become interconnected via the terminal CBn. Consequently, the charge flowing to the high potential side of the battery cell Cn−1 is drawn to the ground by the constant current source ILn via the control signal line CBn, the resistive element Rcbn, and the signal line Ln−1 (see the bold, dashed arrow in FIG. 12).

In the next step 208, the control circuit 26 judges whether or not a second predetermined amount of time has elapsed. In the present embodiment, the draw time is used as the second predetermined amount of time. As described above in the first embodiment, it is best that the inflowing charge quantity and the drawn charge quantity be set in such a way as to become equal. The first predetermined amount of time and the second predetermined amount of time may be the same or different. For example, in a case where the current values of the constant current sources IH and the constant current sources IL are the same, the first predetermined amount of time and the second predetermined amount of time may be set the same. In a case where it is difficult to draw the charge, the current value of the constant current sources IL should be reduced and the charge should be drawn for a long amount of time (switch on the switching elements SWIL for a long amount of time).

In a case where the second predetermined amount of time has not elapsed, the drawing is not yet complete, so the answer is NO and the control circuit 26 stands by. On the other hand, in a case where the second predetermined amount of time has elapsed, the drawing is complete, so the answer is YES and the control circuit 26 advances to step 210.

In step 210, the control circuit 26 switches off the switching elements SWIL that are on and thereafter ends the processing. As a specific example, the control circuit 26 switches off the switching element SWILn and thereafter ends the processing.

As described above, in the present embodiment, the semiconductor circuit 14 of the battery monitoring system 10 equipped with the discharge circuit 13 equipped with the equalization switching elements SW, the resistive elements Rbal for limiting the discharge quantity of the battery cells C, and the resistive elements Rcb that are pull-down resistors is equipped with: the equalization switching element drive component 20 that supplies charge to the gates of the equalization switching elements SW; and the charge drawing component 23 that includes the constant current sources IL for drawing the charge to the ground and the switching elements SWIL that interconnect the constant current sources IL and the control signal lines CB.

When discharging the battery cell Cn, the switching element SWIHn of the equalization switching element drive component 20 is switched on and charge is supplied from the constant current source IHn to the gate of the equalization switching element SWn. Further, the charge supplied from the constant current source IHn flows to the high potential side of the battery cell Cn−1 via the resistive element Rcbn and the control signal line Ln−1. After the switching element SWIHn is switched off and the equalization switching element SWn is switched off, the switching element SWILn of the charge drawing component 23 is switched on, and the control signal line CBn and the constant current source ILn become interconnected via the terminal CBn. Because of this, the charge flowing to the high potential side of the battery cell Cn−1 may be drawn to the ground via the control signal line Ln−1, the resistive element Rcbn, and the control signal line CBn.

In this way, in the present embodiment, when discharging the battery cell Cn, the charge flowing into the battery cell Cn−1 is drawn to the ground by the charge drawing component 23, so the battery cell Cn−1 may be prevented from entering charged state. Consequently, variations in the battery voltages of the battery cells C resulting from discharge may be prevented.

In the present embodiment also, like in the first embodiment, the battery monitoring system 10 may also be configured to include the discharge circuit 15 instead of the discharge circuit 13 and may also be configured to include the low-pass filters 19 (see FIG. 5 to FIG. 8).

In the first embodiment and the second embodiment described above, the battery monitoring system 10 is configured in such a way that the control circuit 26 is disposed inside the semiconductor circuit 14, but the battery monitoring system 10 is not limited to this. The control circuit 26 may also be formed in another circuit (on a chip). Further, the control circuit 26 may also be configured as a semiconductor integrated circuit (on the same chip) equipped with the discharge circuit 13 (the discharge circuit 15) and the semiconductor circuit 14.

Further, in the first embodiment and the second embodiment described above, the battery monitoring system 10 is configured in such a way that the discharge circuit 13 (the discharge circuit 15) is equipped with the resistive elements Rcb, but the battery monitoring system 10 is not limited to this and may also be configured in such a way that the resistive elements Rcb are disposed outside the discharge circuit 13 (the discharge circuit 15).

The configurations of the battery monitoring system 10 and the semiconductor circuit 14 described in the first embodiment and the second embodiment are examples and, it goes without saying, may be changed according to the situation without departing from the gist of the present invention.

What is claimed is:

1. A semiconductor circuit comprising:
a drive component that includes first switching elements connected to discharge switching elements and resistive elements,
the discharge switching elements being formed for each of plural batteries connected in series and in such a way that first ends of the discharge switching elements are connected to high potential sides of the batteries, second ends of the discharge switching elements are connected to low potential sides of the batteries, and control ends of the discharge switching elements are connected to control signal lines, the resistive elements being connected between the control signal lines and the low potential sides of the batteries, and the first switching elements interconnecting, in accordance with a drive time of the discharge switching elements, the control signal lines and drive current sources that supply charge to the control signal lines; and a drawing component that draws charge with draw current sources in accordance with a draw time in which the drawing component draws the charge supplied from the drive component.

2. The semiconductor circuit of claim 1, wherein the drawing component includes second switching elements that interconnect the draw current sources and the low potential sides of the batteries in accordance with the draw time.

3. The semiconductor circuit of claim 2, further comprising a control component that controls so as to switch on the first switching elements during the drive time and controls so as to switch on the second switching elements during the draw time.

4. The semiconductor circuit of claim 1, wherein the drawing component includes second switching elements that interconnect the draw current sources and the control signal lines in accordance with the draw time.

5. The semiconductor circuit of claim 4, further comprising a control component that controls so as to switch on the first switching elements during the drive time and controls so as to switch on the second switching elements during the draw time.

6. The semiconductor circuit of claim 1, wherein a charge quantity of the charge that the drawing component draws is equal to a charge quantity of the charge supplied from the drive component to the control signal lines.

7. A battery monitoring system comprising:
plural batteries that are connected in series;
discharge switching elements that are formed for each of the plural batteries and in such a way that first ends of the discharge switching elements are connected to high potential sides of the batteries, second ends of the discharge switching elements are connected to low potential sides of the batteries, and control ends of the discharge switching elements are connected to control signal lines;
resistive elements that are connected between the control signal lines and the low potential sides of the batteries; and
a semiconductor circuit that drives the discharge switching elements,
wherein the semiconductor circuit includes
a drive component that is connected to the discharge switching elements and the resistive elements and includes first switching elements
with the first switching elements interconnecting, in accordance with a drive time of the discharge switching elements, the control signal lines and drive current sources that supply charge to the control signal lines, and
a drawing component that draws charge with draw current sources in accordance with a draw time in which the drawing component draws the charge supplied from the drive component.

8. The battery monitoring system of claim 7, further comprising discharge adjusting resistive elements including first ends connected to the high potential sides of the batteries and second ends connected to the first ends of the discharge switching elements.

9. The battery monitoring system of claim 8, wherein the discharge adjusting resistive elements are disposed between the drawing component and the resistive elements connected to the control lines to which are connected the control ends of the discharge switching elements of the batteries connected in series on the high potential sides.

10. The battery monitoring system of claim 7, further comprising low-frequency component pass circuits connected to the high potential sides of the batteries.

11. A control method comprising:
with respect to a semiconductor circuit including a drive component that includes first switching elements connected to discharge switching elements and resistive elements, with the discharge switching elements being formed for each of plural batteries connected in series such that first ends of the discharge switching elements are connected to high potential sides of the batteries, second ends of the discharge switching elements are connected to low potential sides of the batteries, and control ends of the discharge switching elements are connected to control signal lines and with the resistive elements being connected between the control signal lines and the low potential sides of the batteries, and with the first switching elements interconnecting, in accordance with a drive time of the discharge switching elements, the control signal lines and drive current sources that supply charge to the control signal lines, and a drawing component that draws charge with draw current sources in accordance with a draw time in which the drawing component draws the charge supplied from the drive component, the drawing component including second switching elements that interconnect the draw current sources and the low potential sides of the batteries,
controlling so as to switch on the first switching elements during the drive time and controlling so as to switch on the second switching elements during the draw time.

* * * * *